(12) United States Patent
Paroha et al.

(10) Patent No.: US 11,803,530 B2
(45) Date of Patent: Oct. 31, 2023

(54) CONVERTING UNI-TEMPORAL DATA TO CLOUD BASED MULTI-TEMPORAL DATA

(71) Applicant: Schlumberger Technology Corporation, Sugar Land, TX (US)

(72) Inventors: Abhay Dutt Paroha, Houston, TX (US); Chinmoy Mohanty, Pune (IN); Naman Bairagi, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/247,545

(22) Filed: Dec. 16, 2020

(65) Prior Publication Data
US 2021/0224243 A1 Jul. 22, 2021

(30) Foreign Application Priority Data
Dec. 18, 2019 (IN) .............................. 201921052724

(51) Int. Cl.
*G06F 16/2458* (2019.01)
*G06F 16/22* (2019.01)
*G06F 16/901* (2019.01)
*G06F 16/21* (2019.01)

(52) U.S. Cl.
CPC ........ *G06F 16/2282* (2019.01); *G06F 16/211* (2019.01); *G06F 16/219* (2019.01); *G06F 16/2477* (2019.01); *G06F 16/9024* (2019.01)

(58) Field of Classification Search
CPC .............. G06F 16/2282; G06F 16/219; G06F 16/2477; G06F 16/211; G06F 16/9024

USPC ......................................................... 707/693
See application file for complete search history.

(56) References Cited

U.S. PATENT DOCUMENTS

| 2013/0018849 | A1* | 1/2013 | Johnston | G06F 16/219 707/687 |
| 2014/0214896 | A1* | 7/2014 | Hotta | G06F 11/3495 707/770 |
| 2014/0222843 | A1* | 8/2014 | Sareen | G06F 16/24564 707/755 |
| 2015/0156213 | A1* | 6/2015 | Baker | H04L 63/1416 726/23 |
| 2016/0050269 | A1* | 2/2016 | Botticelli | H04L 67/1076 709/218 |
| 2016/0125053 | A1* | 5/2016 | Willson | G06F 16/219 707/746 |

(Continued)

*Primary Examiner* — Amy Ng
*Assistant Examiner* — Antonio J Caiado
(74) *Attorney, Agent, or Firm* — Michael Guthrie

(57) ABSTRACT

A method includes receiving configuration data that maps an agent of a source computing system to a node of a graph, maps the node to a table, and maps the agent to an agent topic; and receiving time series data at the agent topic as uni-temporal data from the agent mapped to the node. The method further includes generating a row key, from the configuration data and for the time series data, that includes a value identifier and an acquisition time value; and generating a column identifier, from the configuration data and for the time series data from the agent, that includes a version time value identifying when the time series data is received. The method further includes forming the table as a multi-temporal table by storing the time series data in the table with the row key and with the column identifier.

20 Claims, 11 Drawing Sheets

(56) References Cited

U.S. PATENT DOCUMENTS

2016/0328432 A1* 11/2016 Raghunathan ...... G06F 16/2264
2018/0329967 A1* 11/2018 Lee ..................... G06F 16/2228
2021/0174013 A1* 6/2021 Harada ................. G06F 40/194

* cited by examiner

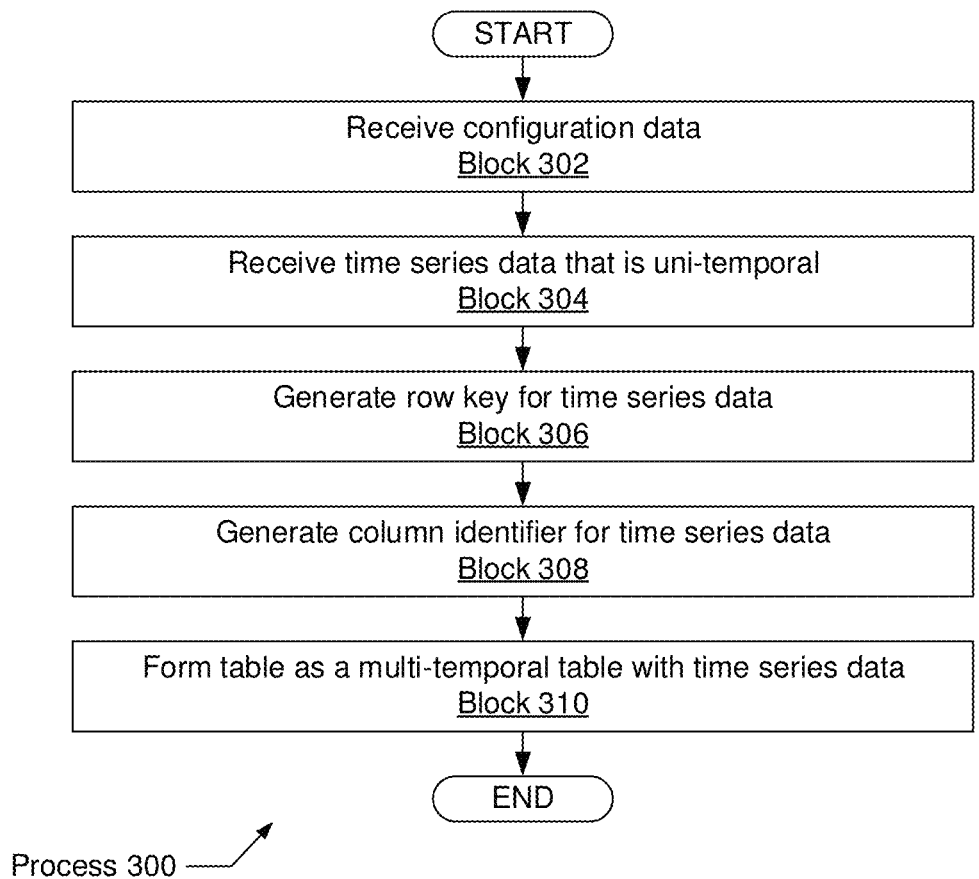
FIG. 3.1

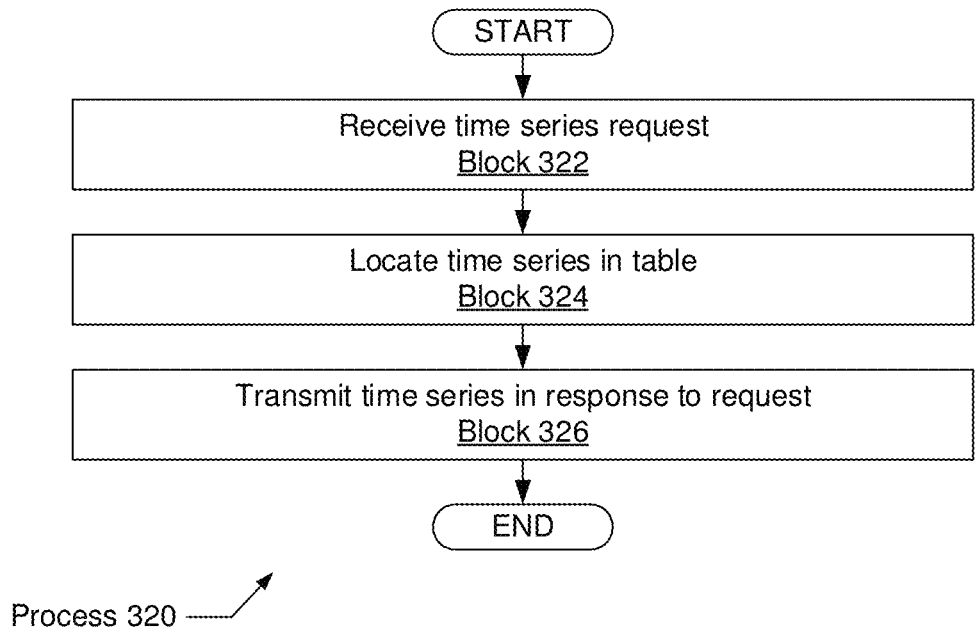
FIG. 3.2
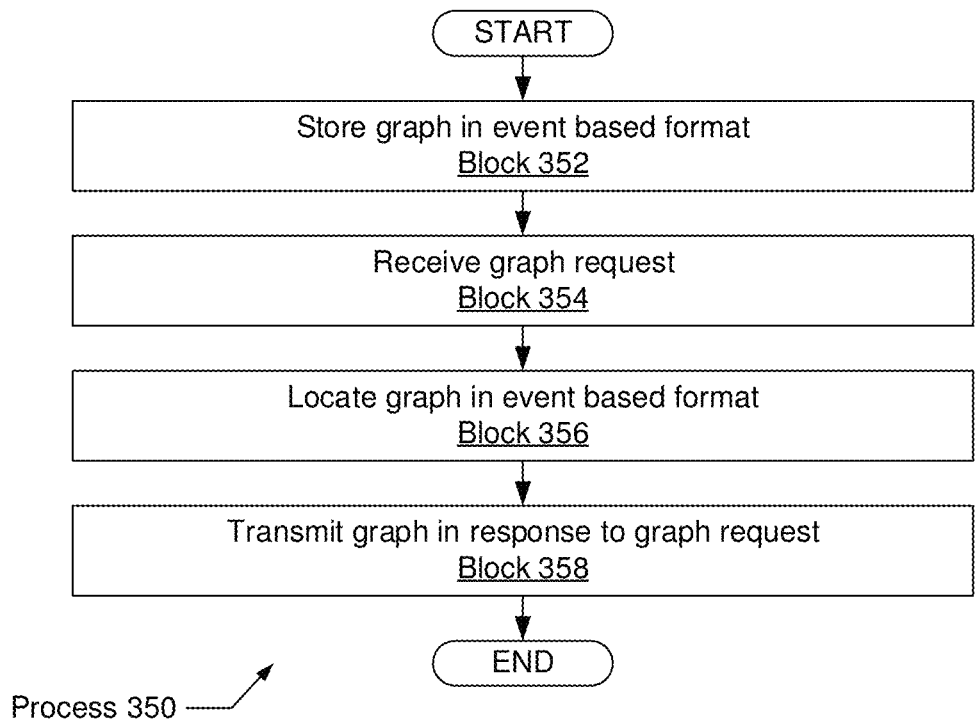
FIG. 3.3

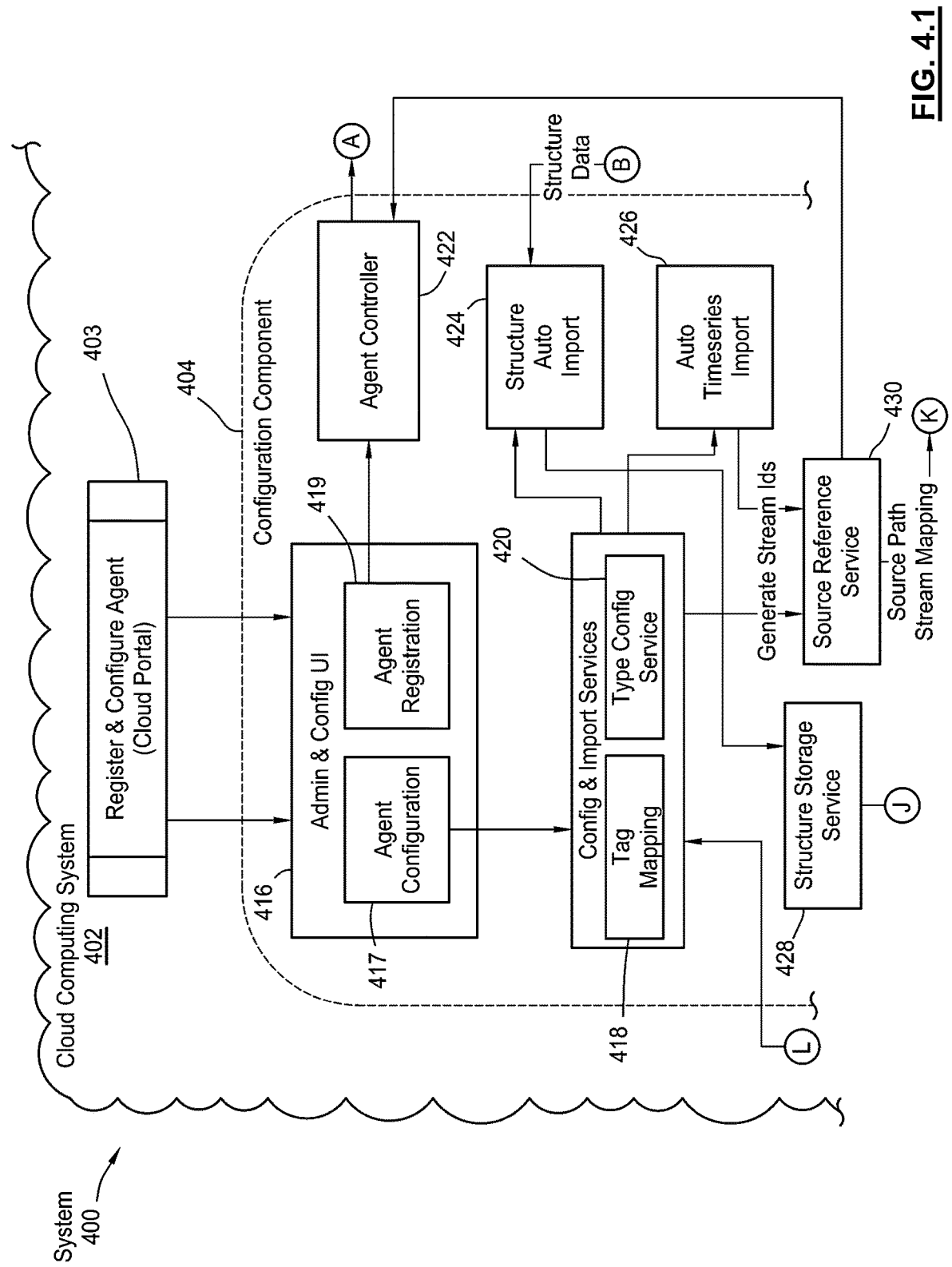
FIG. 4.1

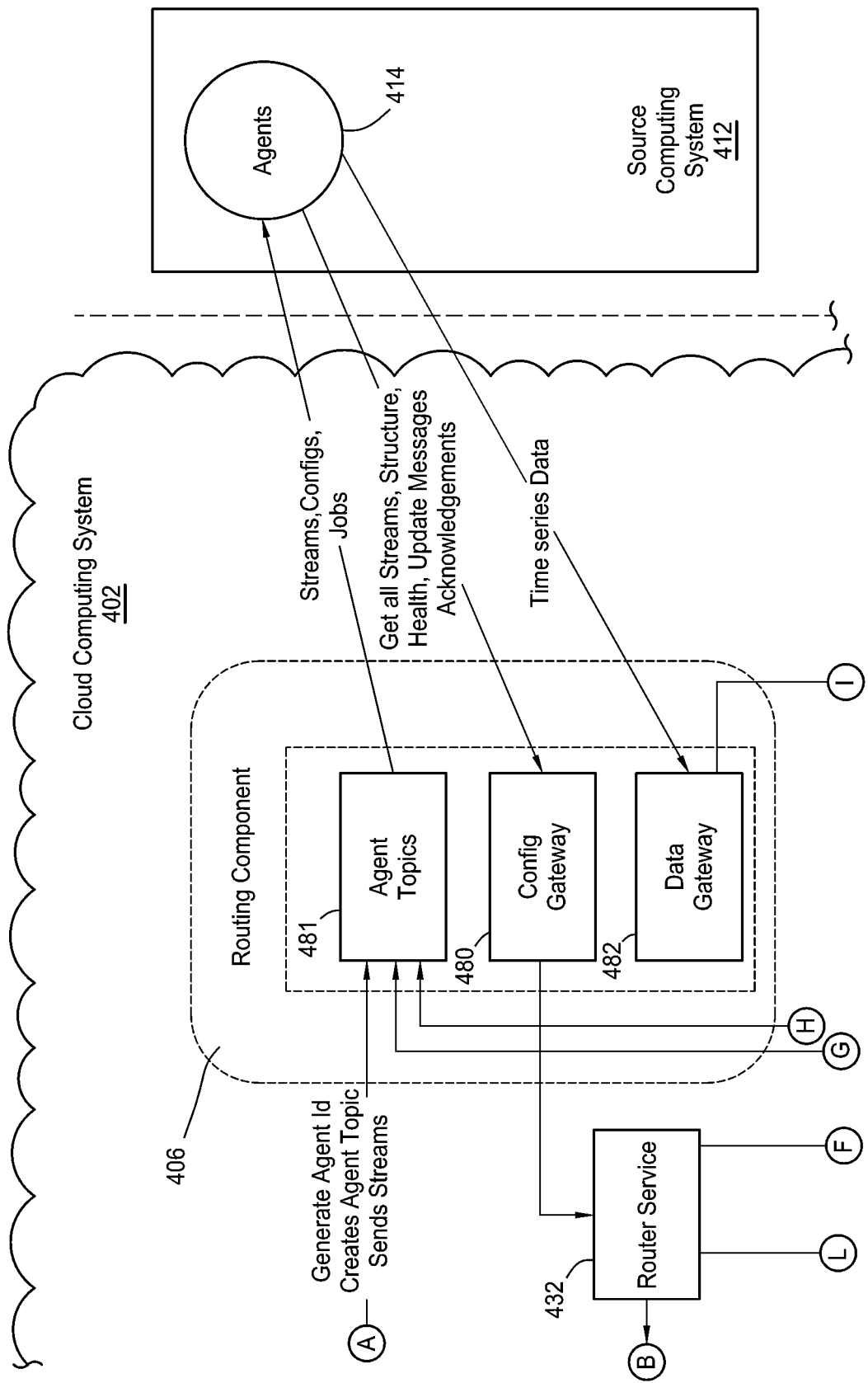
FIG. 4.2

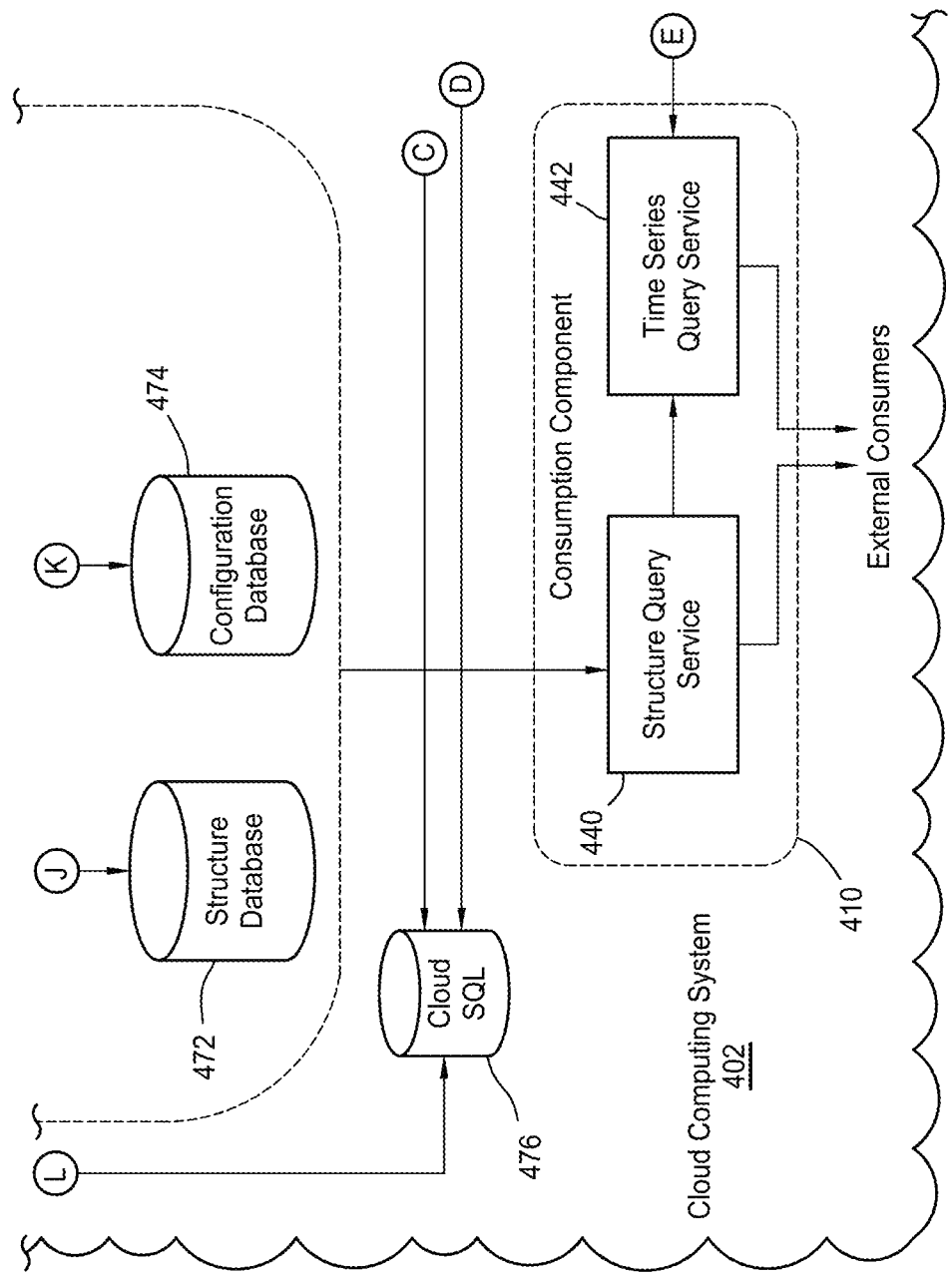
FIG. 4.3

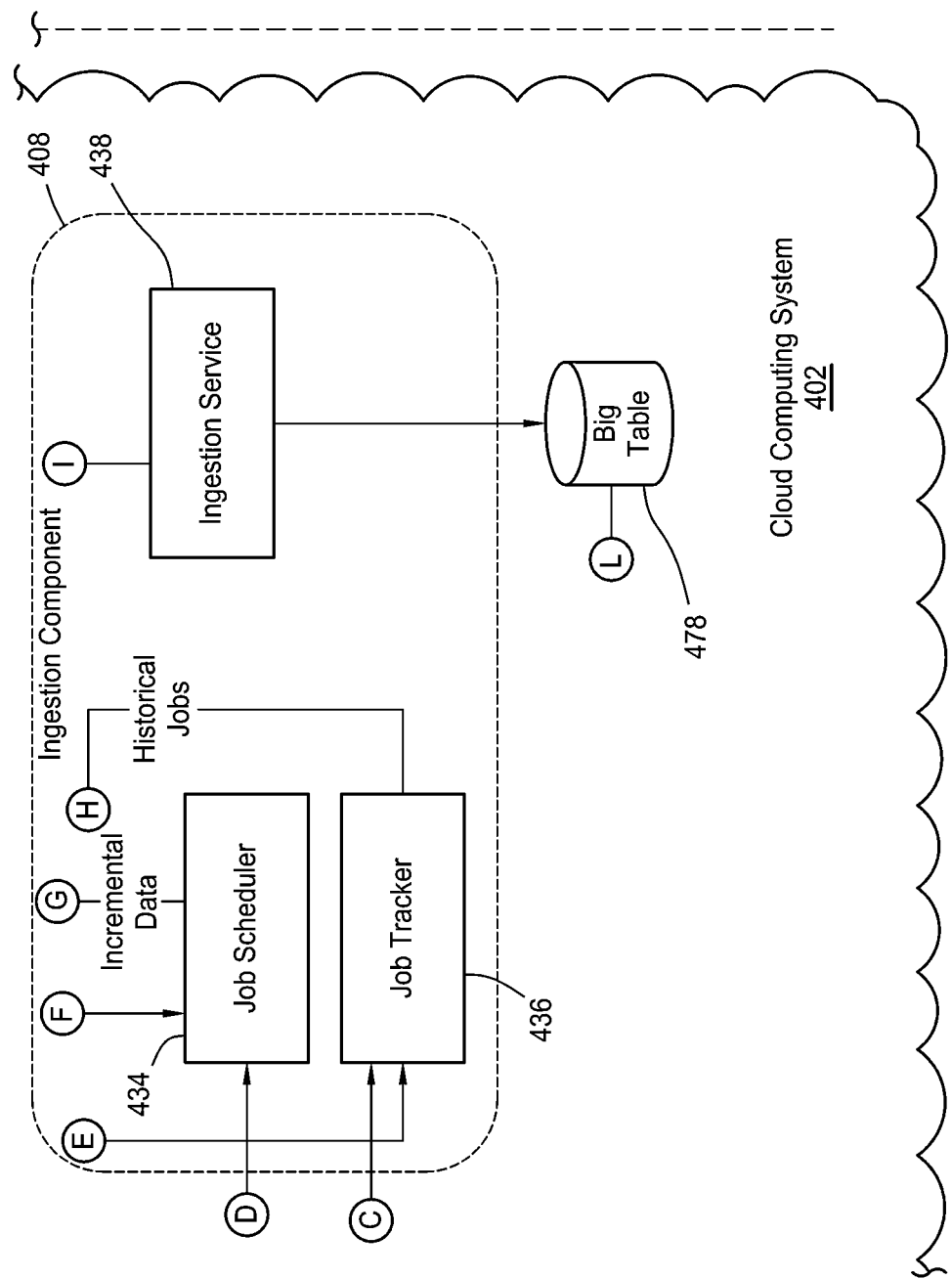
FIG. 4.4

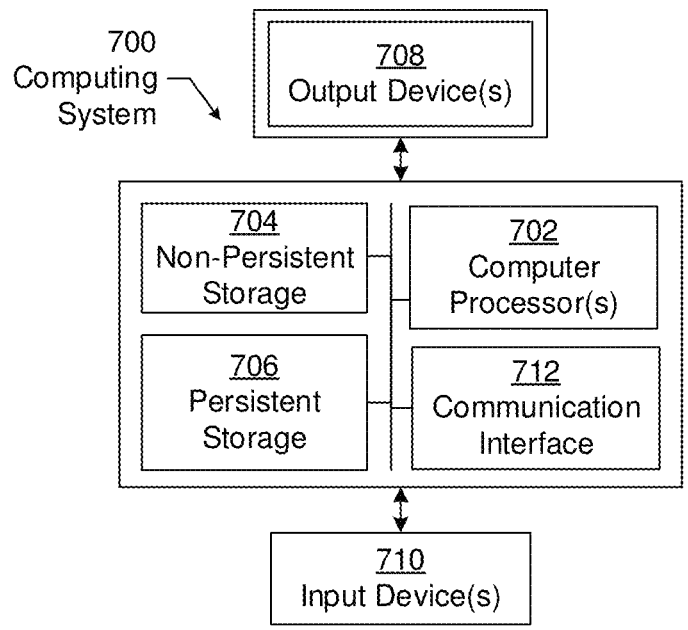
FIG. 7.1
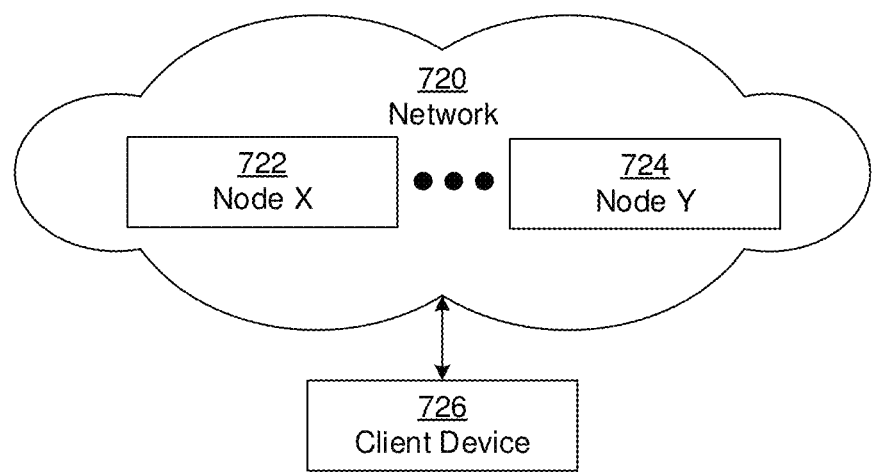
FIG. 7.2

CONVERTING UNI-TEMPORAL DATA TO CLOUD BASED MULTI-TEMPORAL DATA

This application claims the benefit of India Patent Application No. 201921052724 filed on Dec. 18, 2019 and is hereby incorporated by reference in its entirety.

BACKGROUND

Well logs record multiple properties of a borehole of a well. The data in well logs may be changed to more accurately reflect the properties recorded in the well log. A challenge is to keep track of the large amounts of data that is continuously growing and being updated as well as servicing the flow of data through networks of computing systems.

SUMMARY

In general, in one or more aspects, the disclosure relates to a method that includes receiving configuration data that maps an agent of a source computing system to a node of a graph, maps the node to a table, and maps the agent to an agent topic; and receiving time series data at the agent topic as uni-temporal data from the agent mapped to the node. The method further includes generating a row key, from the configuration data and for the time series data, that includes a value identifier and an acquisition time value, the value identifier describing a meaning of the time series data and the acquisition time value identifying when the time series data is acquired by the source computing system; and generating a column identifier, from the configuration data and for the time series data from the agent, that includes a version time value identifying when the time series data is received. The method further includes forming the table as a multi-temporal table by storing the time series data in the table with the row key and with the column identifier, the table being mapped to the node that is mapped to the agent.

BRIEF DESCRIPTION OF DRAWINGS

FIG. 3.1, FIG. 3.2, and FIG. 3.3 show flowcharts in accordance with disclosed embodiments.

FIG. 4.1, FIG. 4.2, FIG. 4.3, FIG. 4.4.

FIG. 7.1 and FIG. 7.2 show computing systems in accordance with disclosed embodiments.

DETAILED DESCRIPTION

Figure 1:
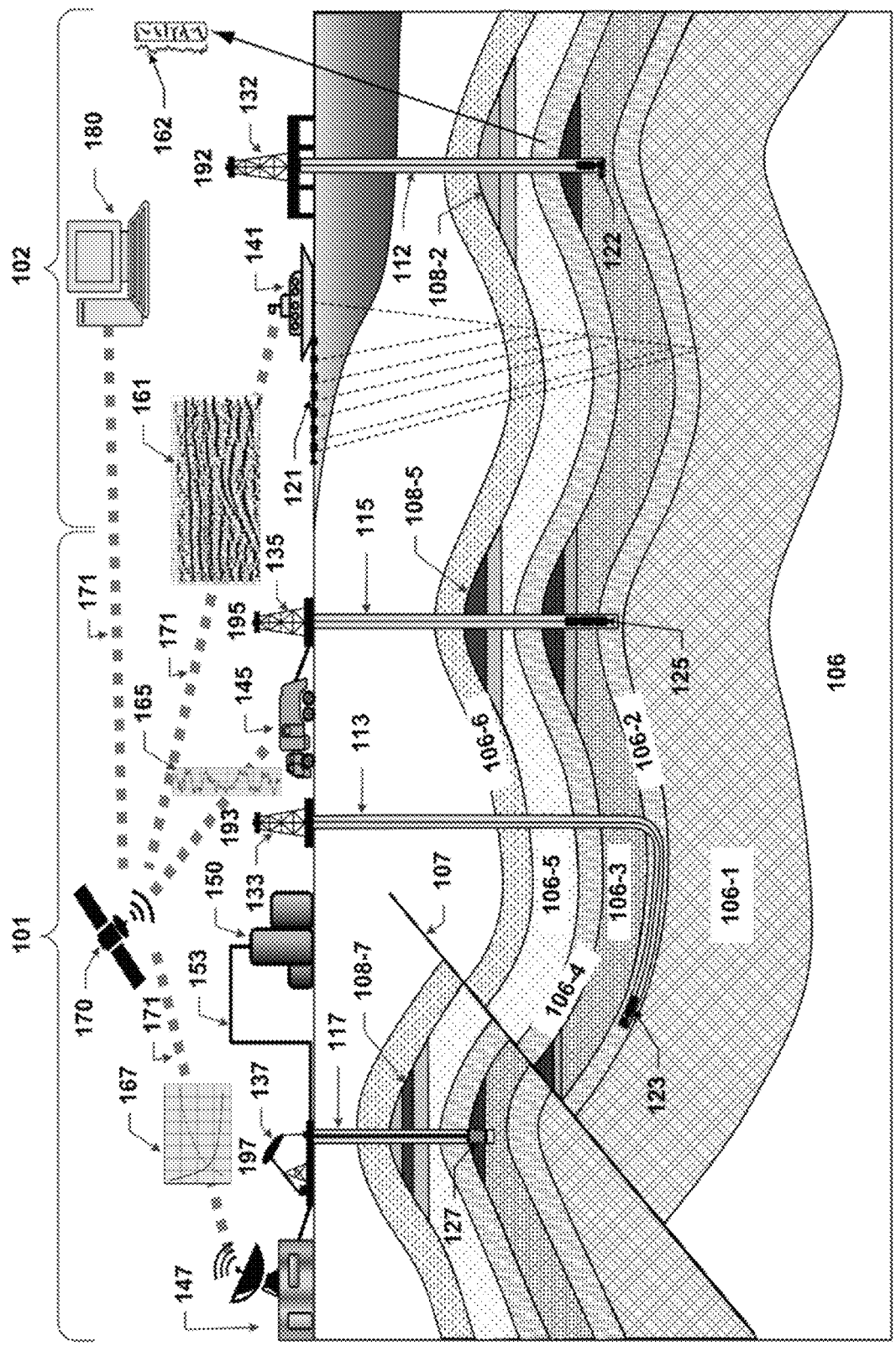
FIG. 1 shows a diagram of a system in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, uni-temporal time series data from wells is received from agents and converted to multi-temporal time series data. The data may be pulled from or pushed by the agents and may be provided on demand. Additionally, the agents provide structure data that identifies the well entities (e.g., fields, batteries, and wells) of the well data and is mapped to a hierarchical graph. The multi-temporal well data and the graphs may be accessed based on the different versions and dates and times that the well data and structure data were received by the system.

Uni-temporal data may include time series data and structure data. Time series data includes data points indexed, listed, or graphed in time order and may be at successive equally spaced points in time. Uni-temporal data may have a single axis of time or version. The time series data may form part of a well log and include measurements of properties of a well and borehole. As an example, uni-temporal data may be time series data retrieved from a data source without identifying the version of the time series data or without identifying the retrieval date and time. A subsequent retrieval of same time series from the data source may include data with different values based on updates made to the time series data by operators of the data source. The data source may not identify that the time series has changed.

Multi-temporal data may include time series data and structure data from the uni-temporal data. Multi-temporal data includes additional axes for the time or the version of the data that distinguishes multiple sets of the same data. As an example, multi-temporal data may be generated from the same time series data retrieved from the data source, but which includes a version or retrieval date and time for the time series. A subsequent retrieval of same time series may be identified by a different version or different date and time. Differences between a previous version of the time series and a subsequent version of the time series may be identified by comparing the previous and subsequent versions of the multi-temporal time series data in contrast to the uni-temporal time series data, which may not allow for such comparison.

Turning now to the Figures, FIG. 1 depicts a schematic view, partially in cross section, of an onshore field (101) and an offshore field (102) in which one or more embodiments may be implemented. The embodiments of FIG. 1 may include the features and embodiments described in FIGS. 2, 3.1, 3.2, 3.3, 4, 5, 6, 7.1, and 7.2. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). The rock formations may include at least one seal rock, for example, the shale layer (106-6), which may act as a top seal. The rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 7.1 and 7.2 and described below.

Figure 2:
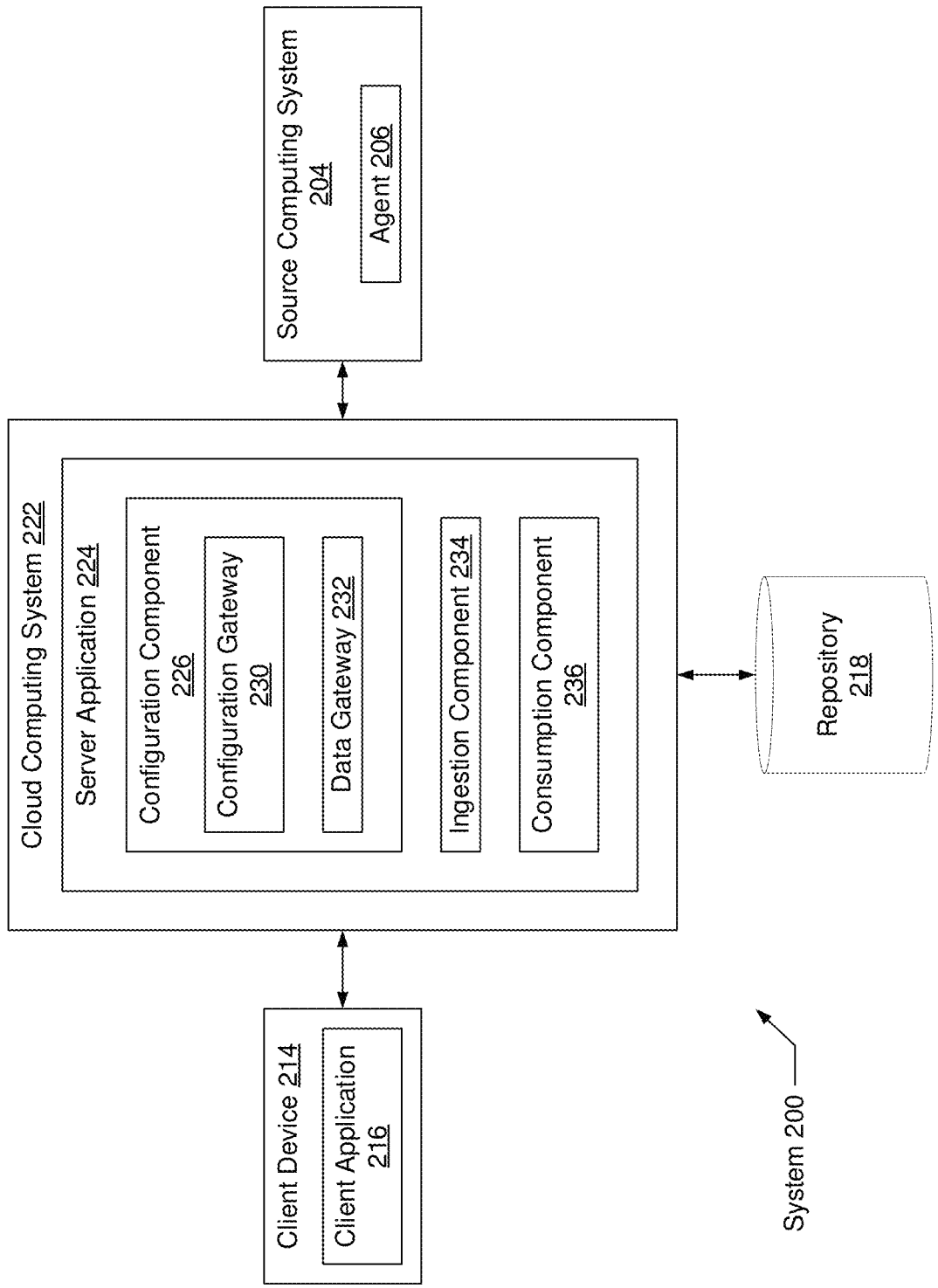
FIG. 2 shows a diagram of a system in accordance with disclosed embodiments.

FIG. 2 shows a diagram of embodiments in accordance with the disclosure. The embodiments of FIG. 2 may include the features and embodiments described in FIGS. 1, 3.1, 3.2, 3.3, 4, 5, 6, 7.1, and 7.2. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

Turning to FIG. 2, the system (200) includes the cloud computing system (222) that converts uni-temporal data to multi-temporal data. The cloud computing system (222) includes the server application (224). The server application (224) includes the configuration component (226), ingestion component (234), and the consumption component (236). The system (200) may include the features and embodiments described in FIGS. 1, 3.1, 3.2, 3.3, 4, 5, 6, 7.1, and 7.2.

The configuration component (226) is a set of programs on the cloud computing system (222). The configuration component (226) controls the import of uni-temporal data as multi-temporal data. The configuration component (226) includes the data gateway (232) and the configuration gateway (230). The configuration component (226) may receive configuration data that is used to control the conversion of uni-temporal data to multi-temporal data. The configuration data may specify the configuration gateway (230) and the data gateway (232) as the gateways to which the agent (206) of the source computing system (204) transmits information. The configuration data may also identify databases in the repository (218) into which data from the agent (206) is stored.

The configuration gateway (230) is a set of programs on the cloud computing system (222) that receives structure data that is analyzed and processed by the configuration component (226). The data gateway (232) is a set of programs on the cloud computing system (222) that receives uni-temporal data and passes the uni-temporal data to the ingestion component (234). The data gateway (232) and the configuration gateway (230) may be third party components provided by a cloud components provider hosting the cloud computing system (222). The data gateway (232) and the configuration gateway (230) may receive data at agent topics. An agent topic may be a uniform resource locator (URL) and port number to which an agent transmits information, including time series data and structure data. The agent topics for the data gateway (232) and the configuration gateway (230) may be unique to the agent (206). The time series data may include data from the surface units (141), (145), and (147) and the wellsite systems (192), (193), (195), and (197) of FIG. 1.

The ingestion component (234) is a set of programs on the cloud computing system (222). The ingestion component (234) receives uni-temporal data and stores the data as multi-temporal data. The ingestion component (234) converts data by tagging the uni-temporal data with a version that may identify when the data is received by the cloud computing system (222). The ingestion component (234) may also include programs for scheduling the retrieval of data from the source computing system (204).

The consumption component (236) is a set of programs on the cloud computing system (222). The consumption component (236) provides the multi-temporal time series data and multi-temporal structure data in response to queries from external programs, applications, and services. The consumption component (236) may expose multiple application programming interfaces (APIs) to access, using requests and queries, time series data and structure data (e.g., graphs) stored on the repository (218).

The cloud computing system (222) is an embodiment of the computing system (700) and the nodes (722) and (724) of FIG. 7.1 and FIG. 7.2. The cloud computing system (222) includes the server application (224). The cloud computing system (222) may be operated by an oilfield services provider to retrieve, convert, and store uni-temporal data from the source computing system (204) as multi-temporal data in the repository (218).

The server application (224) is a set of programs on the cloud computing system (222) that manages and maintains time series data and structure data from the source computing system. The server application (224) may convert time series data and structure data from uni-temporal data to multi-temporal data with the ingestion component (234) and provide access to the multi-temporal data to external programs, including the client application (216). The server application (224) may form a Software-as-a-Service (Saas) platform and utilize container based deployment, event-driven protocols, non-blocking input output (I/O) models, NoSQL (no structured query language) data modelling, representational state transfer application programming interface (RESTful API) design, etc. The programs that form the server application (224) may be deployed in local containers on the cloud computing system (222).

The source computing system (204) provides data to the cloud computing system (222) and includes the agent (206). The source computing system (204) may be an embodiment of the surface units (141), (145), and (147) and the wellsite systems (192), (193), (195), and (197) of FIG. 1.

The agent (206) set of programs on the source computing system (204). The agent (206) may expose an application programming interface (API) utilized by services and applications (including the server application (224)) to retrieve data that is stored or acquired with the source computing system (204).

The client device (214) is an embodiment of the computing system (700) and the nodes (722) and (724) of FIG. 7.1 and FIG. 7.2. The client device (214) includes the client application (216) for accessing the server application (224). The client application (216) may include a graphical user interface for interacting with the server application (224). A user may operate the client application (216) to generate configuration data that configures the tagging, conversion, and storage of the uni-temporal data as multi-temporal data. Additionally, users may operate the client application (216) to consume multi-temporal data through the consumption component (236) using one or more queries.

The client application (216) may be a web browser that accesses the server application (224) using web pages hosted by the cloud computing system (222). Additionally, the client application (216) may be a web service that communicates with the server application (224) using a representational state transfer application programming interface (RESTful API). Although a client server architecture is shown, one or more parts of the server application (224) may be a local application on the client device without departing from the claimed scope.

The repository (218) is a computing system that may include multiple computing devices in accordance with the computing system (700) and the nodes (722) and (724) described below in FIGS. 7.1 and 7.2. The repository (218) may be hosted by a cloud service provider for the oilfield services provider. The cloud service provider may provide hosting, virtualization, and data storage services as well as other cloud services and the oilfield services provider may operate and control the data, programs, and applications that convert the uni-temporal data to multi-temporal data. The data in the repository (218) may include multiple versions of time series data, structure data, and configuration data for multiple wells of multiple geographic locations. The data in the repository (218) may be processed by programs executing on the cloud computing system (222) as described below. The repository (218) may be hosted by the same cloud services provider as the cloud computing system (222).

The repository (218) may include multiple databases. A time series database may store time series data, a structure database may store structure data, and a configuration database may store configuration data.

The time series database may use row keys and column identifiers to store the time series data. Different tables in the time series database may be used to store the time series data for different nodes of the graphs defined by the configuration data and stored in the structure data.

Row keys may include value identifiers and acquisition time values. A value identifier may describe a meaning of the time series data by identifying the property measured with the time series data. The properties may include the amount of oil produced at the well and measurements of physical properties of the well and borehole. The acquisition time value may identify when the time series data is acquired by the source computing system (204).

The column identifiers may include a version time value identifying when the time series is received by the server application. The version time value may also identify the version of the time series data. The column identifier may also include configuration data, such as an identifier of the node and graph to which the time series belongs, and identifier of the source computing system (204). The version time value may be an unsigned integer that represents an hour of a day with a starting date of about eight thousand years before current era (BCE), e.g., midnight Jan. 1, 8000 BCE. The starting date may be selected to allow for the use of historical well data.

The structure data may include graphs of nodes that describe entities of wells (e.g., fields, batteries, and wells). The structure data may be stored in an event based format on the repository (218). The events may identify when the structure data was received by the server application (224) and identify a sequence of additions and removals of nodes and edges to graphs in the repository (218). A graph may contain nodes and edges that describe hierarchical relationships between the well elements for geographic locations.

FIG. 3.1, FIG. 3.2, and FIG. 3.3 show flowcharts of the process (300), the process (320), and the process (350) in accordance with the disclosure for converting uni-temporal data to cloud based multi-temporal data. The embodiments of FIGS. 3.1, 3.2, and 3.3 may be combined and may include the features and embodiments described in FIGS. 1, 2, 4, 5, 6, 7.1, and 7.2. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 3.1, the process (300) converts uni-temporal data to multi-temporal data. In Block 302, configuration data is received. The configuration data may be received from a client application that may be operated by a user. The client application may generate configuration data that may map agents of source systems to graph nodes of graphs, map graph nodes to tables of databases, and map agents to agent topics.

In Block 304, time series data is received that is uni-temporal. The time series data may be received at an agent topic as uni-temporal data from an agent that is mapped to a node of a graph. The agent may be configured to transmit to the agent topic by receiving the agent topic from the server application. The time series data that is received may not include a change log or other identification that changes to the time series data has been made.

The time series data may be received in response to sending a subscription request to the agent for the time series data. The subscription request may identify the data that an agent is to send and when the agent is to send the data. For example, the subscription request may indicate that the agent may send updates to the data when the updates are made to the data.

The time series data may also be received in response to scheduling and sending a periodic request to the agent for the time series data. The scheduling may be maintained by a job scheduler that schedules when periodic requests are sent to agents. The periodic request may indicate whether an agent is to send a full set of data or a partial set of data (e.g., the updates to the data since a previous periodic update request).

In Block 306, row keys are generated for time series data. A row key may be generated for the time series data from the configuration data. The row key may include a value identifier and an acquisition time value. The value identifier may describe a meaning of the time series data and be specified in the configuration data. The acquisition time value may identify when the time series data is acquired by the source computing system.

In Block 308, column identifiers are generated for time series data. The column identifiers may be generated by the ingestion component from the configuration data for time series data from the agent. The column identifiers may include a version time value identifying when the time series is received by the cloud computing system.

In Block 310, tables are formed as multi-temporal tables with time series data. The ingestion service may form a table in a database as a multi-temporal table by storing the time series data in the table with the row key and with the column identifier. The ingestion service may identify the table as being mapped to the node that is mapped to the agent that transmitted the time series data.

Turning to FIG. 3.2, the process (320) handles requests for time series data. In Block 322, time series requests are received. A time series request may be received that requests a time series stored in a table in a database with a column identifier. The time series data being requested may be previous time series data that may be a version of the time series that is not the most current version of the time series and is identified with a previous column identifier. The previous column identifier may identify a date and time before the current date and time. The server application may receive a time series request through the consumption component.

In Block 324, the time series data is located in a table. The consumption component may locate the time series data within the time series database of the repository. The time series data may be previous time series data that is located in a table. The request for the time series data may identify the requested time series data by combinations of one or more of a date, a time, a version, a property type, a measurement value, etc., of the time series data. If the requesting system does not specify a date, time, or version of the time series data, the consumption component may locate the most recent version of the time series data, which may be different from the original version of the time series data. By specifying the date, time, or version, a requesting system may use the same actual data of the time series data for different reports, processes, and applications that are processed at different dates and times.

In Block 326, the time series data that was located is transmitted. The time series data may be a previous time series data that is transmitted in response to the time series request. The time series data may be transmitted by the consumption component of the server application to the system that transmitted the request.

Turning to FIG. 3.3, the process (350) processes graphs. In Block 352, graphs are stored in an event based format. The graph, which may be constructed from structure data, may be stored in an event based format that includes a set of events. The events may identify changes to the nodes and edges of the graphs (including the addition or removal of nodes and edges to the graphs) described in the structure data in the messages from agents, may identify the date and time of the changes, and may identify versions of the graph. The events may be stored in the structure database of the repository. Graphs may be constructed from the sets of events that describe the addition and removal of nodes and edges to the graphs.

In Block 354, graph requests are received. The graph request may be a previous graph request for a previous graph that is not the current graph of a set of well entities. Graph requests may be received by the consumption component of the server application. Graph requests may identify graphs by the dates and times and by the versions of the graphs.

In Block 356, graphs in event-based formats are located. A graph in the event based format may be located and loaded from the set of events that describe the graph. The graph may be a previous graph that is not the current graph in the repository. A graph may be located by identifying the set of events for a graph from an initial event and including the events with dates and times that are prior to the target date time from the graph request. A graph may be loaded from the set of events by constructing the graph in memory by adding and removing the nodes and edges specified in the set up events in the order of the set of events.

In Block 356, graphs are transmitted in response to requests. A graph may be transmitted by the consumption component of the server application in response to the graph request received by the consumption component. The graph may be a previous graph that is in response to a previous graph request.

Figure 5:
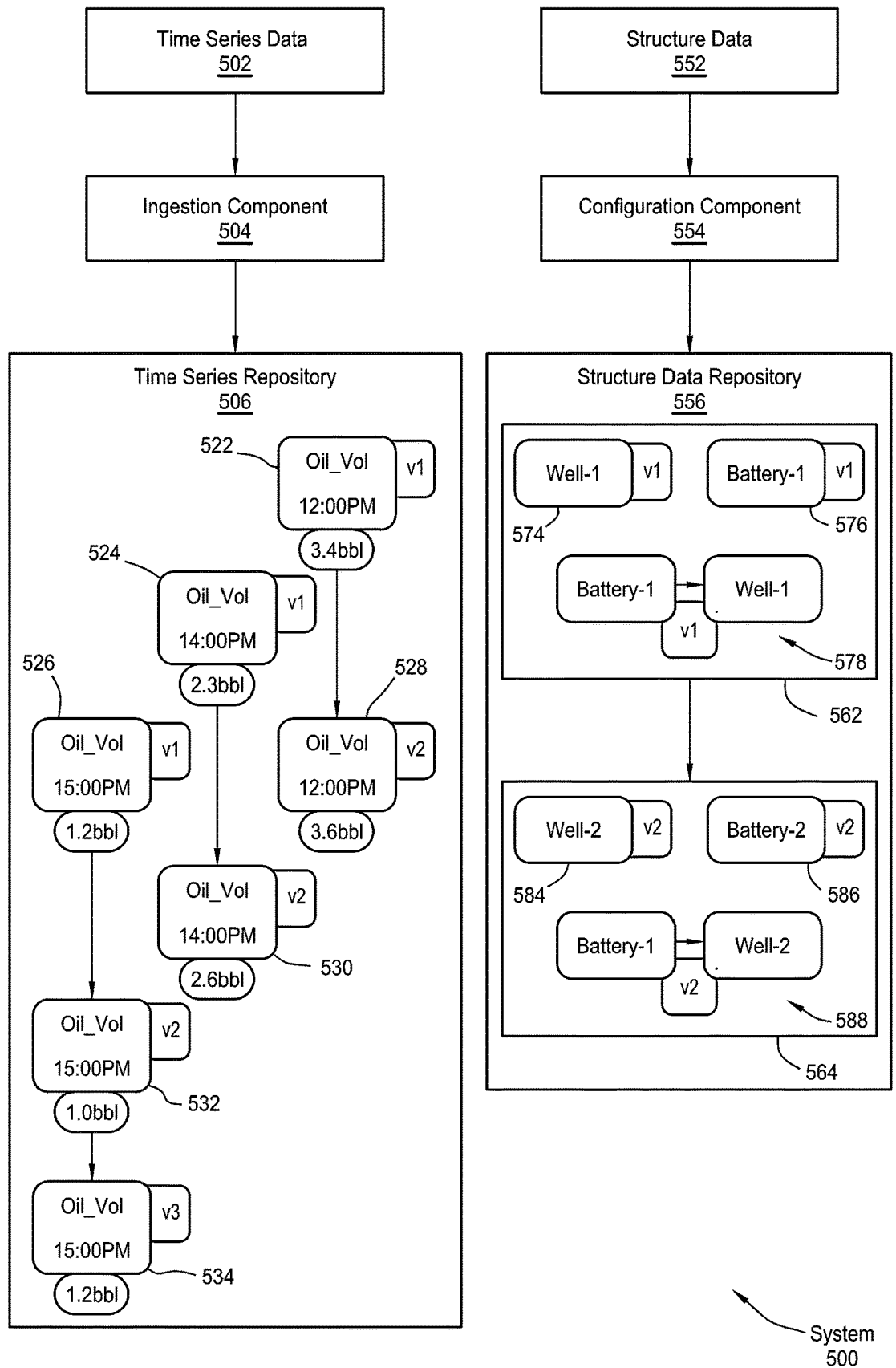
FIG. 5, and FIG. 6 show examples in accordance with disclosed embodiments.
Figure 6:
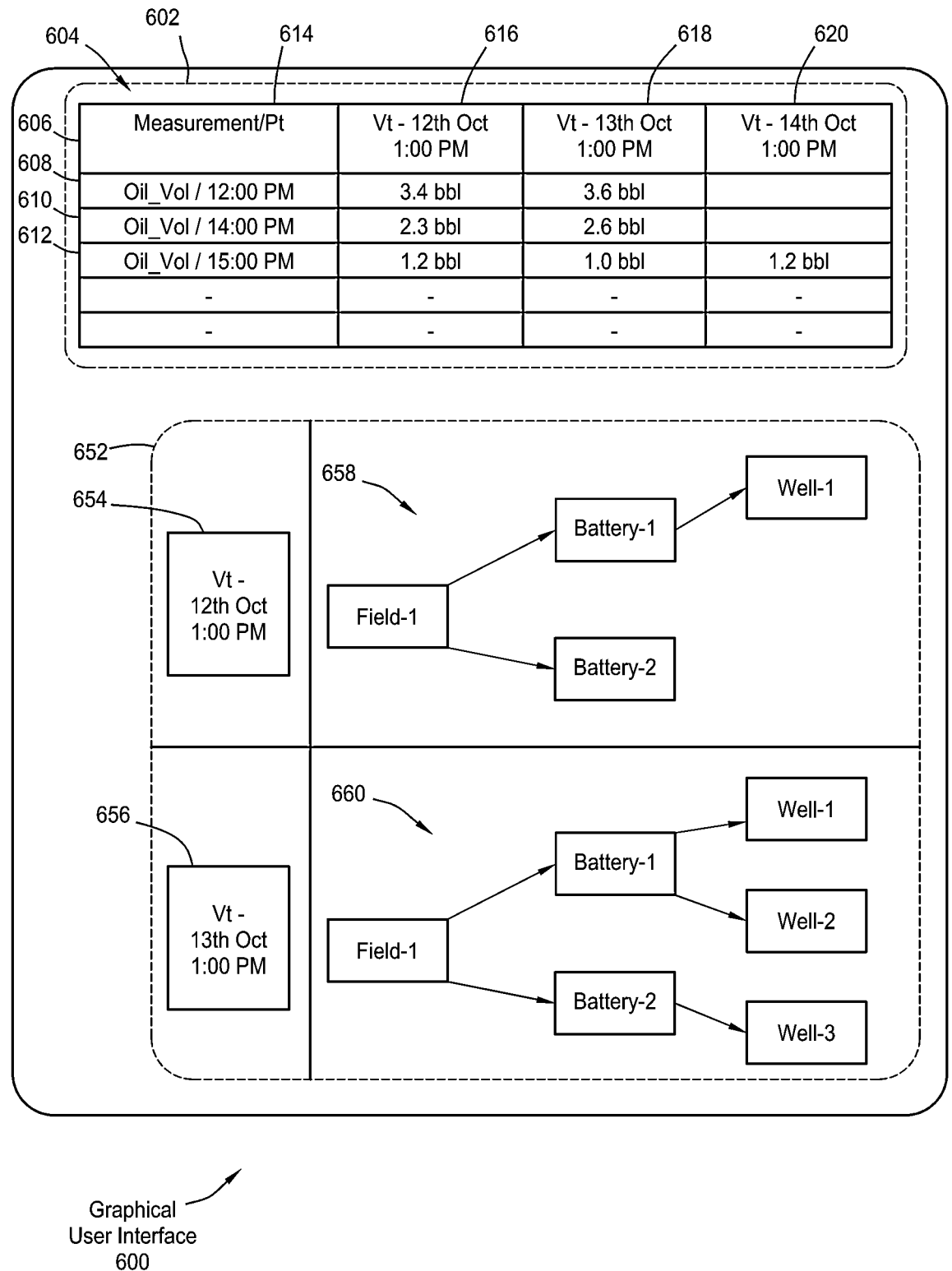

FIG. 4.1, FIG. 4.2, FIG. 4.3, FIG. 4.4, FIG. 5, and FIG. 6 show examples that may be combined and may include the features and embodiments described in FIGS. 1, 2, 3.1, 3.2, 3.3, 7.1, and 7.2. The various elements, widgets, components, and interfaces shown in FIG. 4.1, FIG. 4.2, FIG. 4.3, FIG. 4.4, FIG. 5, and FIG. 6 may be omitted, repeated, combined, and/or altered as shown. Accordingly, the scope of the present disclosure should not be considered limited to the specific arrangements shown in FIG. 4.1, FIG. 4.2, FIG. 4.3, FIG. 4.4, FIG. 5, and FIG. 6.

The system (400), shown with FIG. 4.1, FIG. 4.2, FIG. 4.3, and FIG. 4.4, includes the cloud computing system (402) and the source computing system (412). The cloud computing system (402) includes the configuration component (404), the routing component (406), the ingestion component (408), and the consumption component (410). The source computing system (412) includes the agents (414).

The cloud computing system (402) also includes the structure database (472), the configuration database (474), the cloud structured query language (SQL) database (476), and the big table database (478), which may be parts of one or more repositories. The structure database (472) may store the structure data. The configuration database (474) may store the configuration data. The cloud SQL database (476) may store the job scheduling data used to schedule when data is transferred from the agents (414). The big table database (478) may store the time series data from the agents (414) that is tagged and converted to multi-temporal data.

The configuration component (404) may handle the control and storage of configuration data and structure data with multiple programs and services. The configuration component (404) may execute on the cloud computing system (402). The register and configuration agent (403) is an interface that acts as a portal to the configuration component (403) and may be accessed by an external application, such as a web browser on a client device.

The administration and configuration user interface (UI) (416) is a set of programs in the configuration component (402). The administration and configuration user interface (UI) (416) may be an application used to register and configure the agents (414). The administration and configuration user interface (UI) (416) includes the agent configuration (417) and the agent registration (419), which are the configuration and registration information for the agents (414).

The configuration for an agent is pushed to the agent when the agent that is registered with the system is installed and activated. The configuration indicates the different types of data (structure data and time series data) that may be fetched by the agents (414) and pushed to the cloud computing system (402). The agents (414) may be programs of the source computing system (204) of FIG. 2 and may be programs of the surface units (141), (145), and (147) and the wellsite systems (192), (193), (195), and (197) of FIG. 1.

The tag mapping service (418) may be used to manually map tag information from sources like a corporate historian into a production data integration (PDI) system. The PDI system acts as a database that stores and provides data to cloud native production engineering workflows. The tag information may be sent to the agents (414) using the routing component (406).

The type configuration service (420) may be used to store and retrieve the configuration data for the agents (414). The configuration data may identify the agent topics and graph node and edge mappings for the agents (414).

The agent controller (422) may be a service is that registers and stores information about the agents (414). As an example, the agent controller (422) may store or push the agent topics for the agents (414) in response to commands received with the administration and configuration user interface (416).

The structure auto import service (424) consolidates, processes, and sends messages to the structure storage service (428) for creation of new entity identifiers (field nodes, well nodes, links between fields and wells, etc.) in the system, which uses an event based format to store the graphs that describe the hierarchical structure of the fields, batteries, and wells. The created entity identifiers for the nodes may be sent to auto time series import service (426).

The auto time series import service (426) creates identifiers (with source information) for various measurements for which time series data is to be ingested. The identifiers are stored in the configuration database (474). When one of the agents (414) is activated, the appropriate identifier information is sent over to the agent. The agent may include the identifier when pushing the time series data to the cloud computing system (402) which may include the identifier in the row key for the time series data.

The structure storage service (428) is a set of programs responsible for storing structure data into the structure database (472). The structure storage service may receive commands from the structure auto import service (424).

The source reference service (430) facilitates the storage and retrieval of different information in the system, including agent registration information, measurement identifiers (also referred to as stream identifiers (IDs)), etc. The agent registration information may include a serial number for an agent, an install date and time for the agent, and an activation date and time for the agent and may be stored within the configuration data in the configuration database (474). The measurement identifiers identify the types of measurements in the time series data, may be used in the row key for the time series data, and may be stored within the configuration data in the configuration database (474).

The router service (432) functions as a router for messages (configuration, health, job updates, etc.) coming in from the agents (414). The router service (432) routes the incoming messages to the appropriate services in the cloud computing system (402). For example, a configuration message may include configuration data update the entities of fields or wells, for which corresponding updates need to be made to the graphs describing the fields and wells. The router service (432) may pass the integration message with the configuration data to the structure auto import service (424), which updates the graphs, nodes, and edges stored in the configuration database (474) with the configuration data from the configuration message.

The routing component (406) may be an interface for the agents (414) and may be provided by a third-party, such as a cloud services provider hosting the cloud computing system (402). The routing component (406) may execute on the cloud computing system (402). The routing component (406) may receive the agent topics (481) from the agent controller (422) that are used to configure the configuration gateway (480) and the data gateway (482) that receive data from the agents (414).

The ingestion component (408) may handle the scheduling and storage of data from the source computing system (412). The ingestion component (408) may execute on the cloud computing system (402).

The job scheduler (434) is a service that keeps a record of data load jobs processed by the agents (414). The data load jobs may be for an entire set of data or for an incremental set of data. When the agents (414) finish sessions of incremental data loads, the agents (414) send the status of the job to the job scheduler (434) through the router service (432) and the configuration gateway (480).

The job tracker (436) schedules and sends on-demand jobs to the agents (414). On-demand jobs may be non-periodic data retrieval jobs that request time series data from the agents (414).

The ingestion service (438) is responsible for ingesting time series data into the cloud computing system (402). When the agents (414) send time series data from the source computing system (412), the ingestion service (438) transforms the uni-temporal time series data to multi-temporal data and stores the multi-temporal data in the big table database (478).

The consumption component (410) may handle the retrieval of structure data and time series data in response to requests from external programs and services. The consumption component (410) may execute on the cloud computing system (402).

The structure query service (440) exposes a set of application programming interfaces (APIs) for querying structure data (entities, links, etc.) stored in the structure database (472). The APIs of the structure query service (440) provide a time effective and versioned access to the structure data.

The time series query service (442) exposes a set of APIs for querying time series data (measurements, properties, etc.) stored in the big table database (478). The APIs of the time series query service (442) provide a time effective and versioned access to the time series data.

Turning to FIG. 5, the system (500) tags and stores time series data and structure data. The time series data (502) may be from an agent of a source computing system and received by the ingestion component (504). The time series data (502) is uni-temporal data.

The ingestion component (504) converts the uni-temporal time series data (502) to multi-temporal time series data that is stored in the time series repository (506). The conversion may be performed by tagging the time series data (502).

The time series repository (506) receives the multi-temporal time series data from the ingestion component (504). The time series repository (506) includes the data elements (522) through (534). The data elements (522) through (526) are a first version of a time series. The data elements (528) through (532) are a second version of a time series. The data element (534) is part of a third version of a time series. The data elements include corresponding version numbers, row key identifiers, and values. For example, the data element (522) includes the version number "V1", the row key identifier "Oil_Vol 12:00 PM", and the value "3.4 bbl".

The time series repository (506) may store the differences between different versions of a time series. The current version of the time series stored in the time series repository (506), which may responsive to a request for the current data, may include the second version data elements (528) and (530) and the third version data element (534). A request for the first version of data may return the first version data (522) through (526).

The structure data (552) may be from an agent of a source computing system and received by the configuration component (554). The structure data (552) is uni-temporal data.

The configuration component (554) converts the uni-temporal structure data (552) to multi-temporal structure data that is event based and stored in the structure data repository (556). The conversion may be performed by tagging the structure data (502).

The structure data repository (552) receives the multi-temporal structure data from the configuration component (554). The structure data repository (552) includes the events (562) and (564). The event (562) may be received in a message from an agent and the event (564) may be received in a subsequent message from an agent and include additional changes to the structure data. The event (562) includes the structure data elements (574) through (578). The event (564) includes the structure data elements (584)

through (588). The structure data elements include corresponding version numbers, and identifiers. For example, the structure data elements of the event (562) include the version number "V1". The structure data element (574) includes the identifier "Well-1" to identify the node of the graph to which the data element (574) belongs. The structure data element (576) includes the identifier "Battery-1", which identifies another node of the graph. The structure data element (578) identifies an edge from the node of the structure data element (576) to the node of the structure data element (574), i.e., a link from "Battery-1" to "Well-1".

A structure query for the most current graph may include a graph constructed from the structure data elements from the events (562) and (564). A structure query for a previous graph may include a graph constructed from the structured data of the event (562).

Turning to FIG. 6, the graphical user interface (600) is displayed on a computing system, such as those described in the other Figures, including the E&P computer system (180), the client device (214), and the computing system (700) of FIGS. 1, 2, and 7.1. The graphical user interface (600) includes the time series view (602) and the graph view (652).

The time series view (602) includes the table (604) with the rows (606) through (612) and the columns (614) through (620). The row (606) is a header row that shows the column identifiers for the columns (614) through (620). The column (614) is a header column that shows the row keys for the rows (608) through (612).

The row keys for the rows (608) through (612) include value identifiers and acquisition time values. The row (608) is the oil volume at 12:00 PM on the acquisition date; the row (610) is the oil volume at 14:00 PM on the acquisition date; and the row (612) is the oil volume at 15:00 PM on the acquisition date.

The column identifiers for the columns (616) through (620) include version time values. The column (616) is for the time series that was received on October 12 at 1:00 PM, the column (618) is for the time series that was received on October 13 at 1:00 PM, and the column (620) is for the time series that was received on October 14 at 1:00 PM. The original acquisition date may be before the initial retrieval date, e.g., the original acquisition date may be on October 11.

The column (616) may be returned in response to a request for the first version of the data and the columns (618) and (620) may be returned in response to requests for subsequent versions of the data. The table (604) only shows data in cells where the value is changed between versions of the time series. The blank cells in the column (620) indicate that the values for those rows did not change from the version of the column (618) to the version of the column (620).

The graph view (652) shows two versions of a graph. The version tag (654) indicates that the graph (658) was generated on October 12 at 1:00 PM. The version tag (656) indicates that the graph (660) was generated on October 13 at 1:00 PM. The graphs (658) and (660) are reconstructed from an event based format from a structure data repository. A node "Well-2", a node for "Well-3", an edges from "Battery-1" to "Well-2", and an edge from "Battery-2" to "Well-3" are added to the graph (660) and were not in the graph (658).

Embodiments disclosed herein may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the technology.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7.1 and the nodes and/or client device in FIG. 7.2. Other functions may be performed using one or more embodiments of the technology.

While the technology has been described with respect to a limited number of embodiments, those skilled in the art, having benefit of this disclosure, will appreciate that other embodiments can be devised which do not depart from the scope as disclosed herein. Accordingly, the scope of the technology should be limited only by the attached claims.

What is claimed is:

1. A method comprising:
  receiving configuration data that maps an agent of a source computing system to a node of a graph, maps the node to a table, and maps the agent to an agent topic;
  receiving time series data at the agent topic as unitemporal data from the agent mapped to the node;
  generating a row key, from the configuration data and for the time series data, that includes a value identifier and an acquisition time value, the value identifier describing the time series data and the acquisition time value identifying when the time series data is acquired by the source computing system;

generating a column identifier, from the configuration data and for the time series data from the agent, that includes a version time value identifying when the time series data is received;

forming the table as a multi-temporal table with a row comprising the row key and a column comprising the column identifier by storing the time series data in the table using the acquisition time value of the row key and using the version time value of the column identifier, the table being mapped to the node that is mapped to the agent; and presenting the row key and the column identifier in the multi-temporal table in a graphical user interface.

2. The method of claim 1, wherein the table is a first table and the node is a first node, further comprising:
receiving the time series data from the agent at a data gateway with the agent topic;
receiving a message, which includes structure data, from the agent at a configuration gateway with a configuration topic specified in the configuration data;
updating the configuration data based on a structure data; and
forming a second table that is mapped to a second node based on the updated configuration data.

3. The method of claim 1, further comprising:
receiving a time series request for previous time series data stored in the table with a previous column identifier;
locating the previous time series data in the table; and
transmitting the previous time series data in response to the time series request.

4. The method of claim 1, further comprising:
storing the graph in an event based format that includes a set of events;
receiving a previous graph request for a previous graph;
locating the previous graph in the event based format and loading the previous graph from the set of events; and
transmitting the previous graph in response to the previous graph request.

5. The method of claim 1, wherein the version time value is an unsigned integer that represents an hour of a day with a starting date of eight thousand years before current era.

6. The method of claim 1, further comprising:
sending a subscription request to the agent; and
receiving the time series data in response to the subscription request.

7. The method of claim 1, further comprising:
scheduling a periodic request for the agent;
sending the periodic request to the agent; and
receiving the time series data in response to the periodic request.

8. A system comprising:
a memory coupled to a processor;
an application that executes on the processor, uses the memory, and is configured for:
receiving, by a configuration service of the application, configuration data that maps an agent of a source computing system to a node of a graph, maps the node to a table, and maps the agent to an agent topic;
receiving time series data at the agent topic as uni-temporal data from the agent mapped to the node;
generating, by an ingestion service of the application, a row key, from the configuration data and for the time series data, that includes a value identifier and an acquisition time value, the value identifier describing the time series data and the acquisition time value identifying when the time series data is acquired by the source computing system;

generating a column identifier, from the configuration data and for the time series data from the agent, that includes a version time value identifying when the time series data is received;

forming the table as a multi-temporal table with a row comprising the row key and a column comprising the column identifier by storing the time series data in the table using the acquisition time value of the row key and using the version time value of the column identifier, the table being mapped to the node that is mapped to the agent; and presenting the row key and the column identifier in the multi-temporal table in a graphical user interface.

9. The system of claim 8, wherein the table is a first table, wherein the node is a first node, and wherein the application is further configured for:
receiving the time series data from the agent at a data gateway with the agent topic;
receiving a message, which includes structure data, from the agent at a configuration gateway with a configuration topic specified in the configuration data;
updating the configuration data based on a structure data; and
forming a second table that is mapped to a second node based on the updated configuration data.

10. The system of claim 8, wherein the application is further configured for:
receiving a time series request for previous time series data stored in the table with a previous column identifier;
locating the previous time series data in the table; and
transmitting the previous time series data in response to the time series request.

11. The system of claim 8, wherein the application is further configured for:
storing the graph in an event based format that includes a set of events;
receiving a previous graph request for a previous graph;
locating the previous graph in the event based format and loading the previous graph from the set of events; and
transmitting the previous graph in response to the previous graph request.

12. The system of claim 8, wherein the version time value is an unsigned integer that represents an hour of a day with a starting date of eight thousand years before current era.

13. The system of claim 8, wherein the application is further configured for:
sending a subscription request to the agent; and
receiving the time series data in response to the subscription request.

14. The system of claim 8, wherein the application is further configured for:
scheduling a periodic request for the agent;
sending the periodic request to the agent; and
receiving the time series data in response to the periodic request.

15. A non-transitory computer readable medium comprising computer readable program code for:
receiving configuration data that maps an agent of a source computing system to a node of a graph, maps the node to a table, and maps the agent to an agent topic;
receiving time series data at the agent topic as uni-temporal data from the agent mapped to the node;

generating a row key, from the configuration data and for the time series data, that includes a value identifier and an acquisition time value, the value identifier describing the time series data and the acquisition time value identifying when the time series data is acquired by the source computing system;

generating a column identifier, from the configuration data and for the time series data from the agent, that includes a version time value identifying when the time series data is received;

forming the table as a multi-temporal table with a row comprising the row key and a column comprising the column identifier by storing the time series data in the table using the acquisition time value of the row key and using the version time value of the column identifier, the table being mapped to the node that is mapped to the agent; and presenting the row key and the column identifier in the multi-temporal table in a graphical user interface.

16. The non-transitory computer readable medium of claim 15, wherein the table is a first table and the node is a first node, further comprising computer readable program code for:

receiving the time series data from the agent at a data gateway with the agent topic;

receiving a message, which includes structure data, from the agent at a configuration gateway with a configuration topic specified in the configuration data;

updating the configuration data based on a structure data; and forming a second table that is mapped to a second node based on the updated configuration data.

17. The non-transitory computer readable medium of claim 15, further comprising computer readable program code for:

receiving a time series request for previous time series data stored in the table with a previous column identifier;

locating the previous time series data in the table; and transmitting the previous time series data in response to the time series request.

18. The non-transitory computer readable medium of claim 15, further comprising computer readable program code for:

storing the graph in an event based format that includes a set of events;

receiving a previous graph request for a previous graph;

locating the previous graph in the event based format and loading the previous graph from the set of events; and transmitting the previous graph in response to the previous graph request.

19. The non-transitory computer readable medium of claim 15, wherein the version time value is an unsigned integer that represents an hour of a day with a starting date of eight thousand years before current era.

20. The non-transitory computer readable medium of claim 15, further comprising computer readable program code for:

sending a subscription request to the agent; and receiving the time series data in response to the subscription request.

* * * * *